United States Patent Office 3,737,490
Patented June 5, 1973

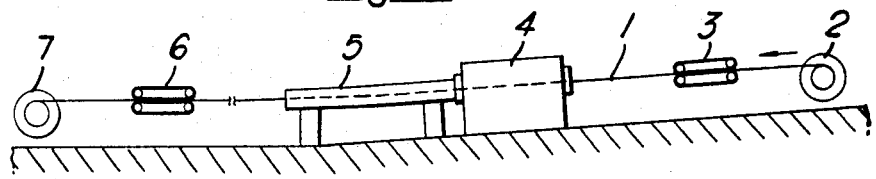
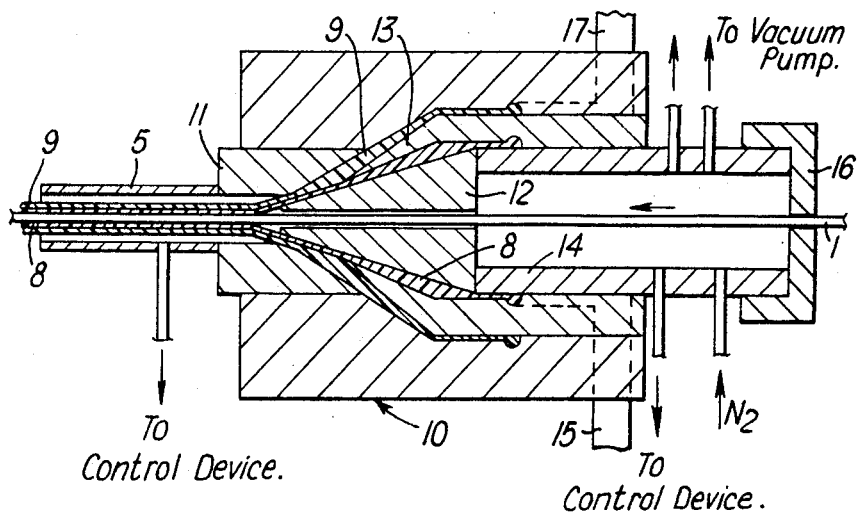

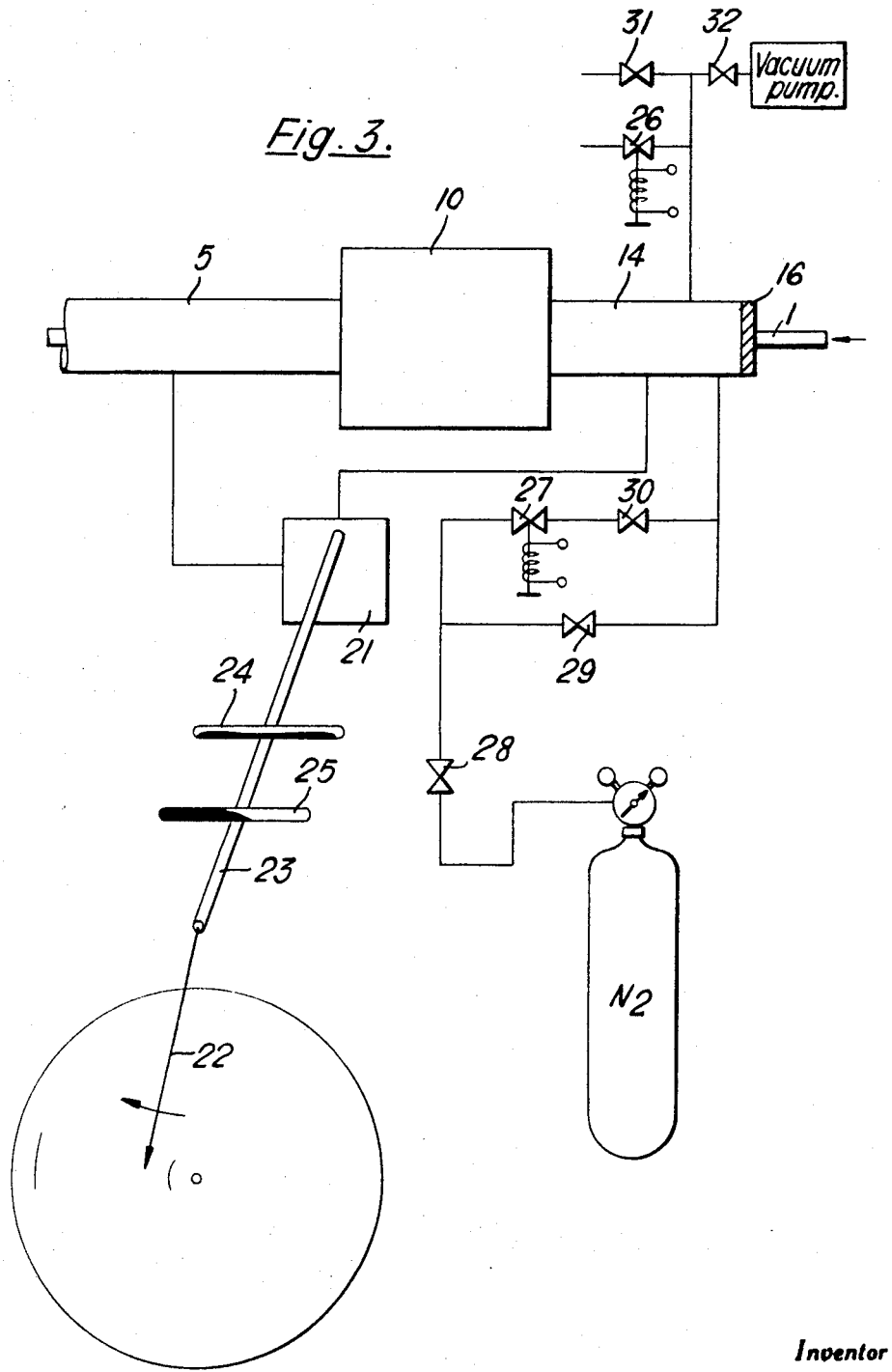

3,737,490
MANUFACTURE OF INSULATED ELECTRIC CABLES
Peter Nicholson, Chatham, England, assignor to British Insulated Callender's Cables Limited, London, England
Filed Dec. 9, 1970, Ser. No. 96,463
Claims priority, application Great Britain, Dec. 9, 1969, 60,011/69
The portion of the term of the patent subsequent to Sept. 5, 1989, has been disclaimed
Int. Cl. B29f *3/10;* B29h *9/08*
U.S. Cl. 264—40                    10 Claims

ABSTRACT OF THE DISCLOSURE

A composite covering comprising at least two layers of different covering materials is extruded on a continuously advancing core by passing the core through the core tube of an extrusion machine which feeds extruded, peripherally continuous layers of the covering materials simultaneously towards the outlet end of the extrusion machine and causing the extruded layers to come into complete and intimate interfacial contact upstream of the outlet end of the extrusion machine. The composite covering so formed is treated, e.g. cured, continuously by passing the covered core through a chamber hermetically sealed to the outlet end of the extrusion machine and containing a fluid medium at super-atmospheric pressure. At the same time, fluid under pressure is injected into the interior of the core tube and is maintained at a pressure less than that of the fluid medium by an amount such that the pressure difference across the extruded composite covering at the extrusion orifice is sufficient to cause the extruded composite covering to collapse firmly on to the core as it emerges from the extrusion machine.

---

This invention relates to the manufacture of insulated electric cables and wires of the kind in which a covering is extruded directly or indirectly on the cable or wire and the covered cable or wire is then passed continuously through a vessel wherein the covering is cured or strengthened or otherwise treated by the application or abstraction of heat. Examples of such covering materials are ntaural rubber compositions, synthetic rubber-like compositions such as neoprene (polychlorobutadiene), butyl rubber, silicon rubber and styrene butadiene rubber (GR–S), and synthetic plastics materials such as olefine polymers containing a suitable agent for inducing crosslinking between the molecules of the synthetic plastics materials during the curing process, each of which materials (hereinafter referred to as "covering materials") may or may not incorporate additives to render it electrically conductive.

The cable or wire on to which covering material is extruded may be a bare or previously covered wire or strand, or a group of bare or previously covered wires or strands constituting a cable and, for convenience, all such cables and wires will hereinafter be included in the term "core."

In a previosuly proposed method of manufacturing on extruded covering on a continuously advancing core, the core is caused to pass through the core tube of an extrusion machine which applies a continuous covering on to the core, the covered core is caused to pass through a chamber hermetically sealed to the outlet end of the extrusion machine and containing a fluid medium at super-atmospheric pressure to effect continuous treatment of the covering, and fluid under pressure is injected into the interior of the core tube and is maintained at a pressure which is less than that of the fluid medium by an amount such that the pressure difference across the extruded covering at the extrusion orifice is sufficient to cause the extruded covering to collapse firmly on to the core as it emerges from the extrusion machine but is insufficient to force the extruded covering back along the core tube.

By virtue of the fact that a pressure difference across the extruded covering at the extrusion orifice is employed to collapse the covering firmly on to the advancing core, for manufacture of coverings applied to a close tolerance the inner die or point and the outer die at the extrusion orifice of the extrusion machine need not be manufactured to the same close tolerance as otherwise would be the case if the covering is applied by pressure extrusion as the wall thickness of the covering can be controlled by varying the throughput speed of the core. Accordingly the same set of inner die or point and outer die can be employed for substantially all cores of the same nominal diameter thereby considerably reducing the tool costs that would otherwise have been incurred. This previously proposed method has the important advantage that it can be employed in the manufacture of extruded coverings on shaped cores of other than circular cross-section, for instance solid aluminium conductors of sector shape, with substantially the same degree of close tolerance in the radial thickness of the extruded covering as that of coverings for equivalent cores of circular cross-section. Moreover, this method can be effected on cores of shaped cross-section using inner dies or points or circular cross-section and outer dies having circular apertures of an appropriate diameter, thereby providing a considerable saving in the cost of tooling of die sets.

With a view to substantially eliminating the possibility of a space or spaces being created between an extruded covering or insulating material on a core and an underlying and/or overlying covering of semi-conductive material constituting an inner or outer screening layer, in which space or spaces electrical discharges can take place, it has also previously been proposed to extrude simultaneously on to a core at least one layer of insulating covering material and at least one layer of semi-conductive covering material, which materials are capable of bonding one with another to provide a composite covering on the core in which there is complete an intimate contact at the interface between adjoining layers of covering material.

The present invention has for its object the provision of a method of manufacturing an extruded composite covering, comprising two or more layers of differeint covering materials, on a continuously advancing core by a float-down process.

In accordance with the invention the present method comprises causing the core to pass through the core tube of an extrusion machine which feeds extruded, peripherally continuous layers of the covering materials simultaneously towards the outlet end of the extrusion machine; causing the extruded layers to come into complete and intimate interfacial contact upstream of the outlet end of the extrusion machine; effecting continuous treatment of the composite covering so formed by passing the covered core through a chamber hermetically sealed to the outlet end of the extrusion machine and containing a fluid medium at super-atmospheric pressure; and, at the same time, injecting fluid under pressure into the interior of the core tube and maintaining the fluid at a pressure which is less than that of the fluid medium by an amount such that the pressure difference across the extruded composite covering at the extrusion orifice is sufficient to cause the extruded composite covering to collapse firmly on to the core as it emerges from the extrusion machine but is insufficient to force the extruded composite covering back along the core tube.

Where the composite covering is to be cured or strengthened by the application of heat the fluid medium will be steam or other suitable fluid curing medium and the chamber will generally also contain a coolant at substantially the same pressure as the curing medium for cooling the cured composite covering. Where the treatment of the composite covering comprises the continuous abstraction of heat therefrom the fluid medium will be water or other suitable fluid cooling medium.

In employing the method of the present invention to manufacture a core having an extruded insulating layer sandwiched between and bonded in complete and intimate interfacial contact with extruded inner and outer semi-conductive layers, the two semi-conductive layers may each comprise the same semi-conductive covering material or these two semiconductive layers may be of different semi-conductive covering materials. In the latter case the outer semiconductive layer may comprise a semi-conductive covering material which is of such a composition that the bond with the underlying extruded insulating layer is weaker than that between the inner semi-conductive layer and the extruded insulating layer, thereby facilitating cutting back and stripping of the outer semi-conductive layer for jointing or terminating purposes. Where the covering material employed for the insulating layer is XL polyethylene it is preferred to use for the inner semi-conductive layer conventional, compatible semi-conductive XL polyethylene and for the outer semi-conductive layer any semi-conductive polymer or rubber compound compatible with cross-linkable polyethylene, such as EPR and copolymers of ethylene and propylene of suitable high melting point.

The fluid injected into the core tube is preferably, but not essentially, an inert gas, such as nitrogen.

The invention also resides in apparatus for extruding a composite covering comprising two or more peripherally continuous layers of different covering materials on to an advancing core and for continuously treating the composite covering with a fluid medium at super-atmospheric pressure, which apparatus comprises an extrusion machine having an annular extrusion orifice defined by an outer die and an inner die or point mounted on the front end of a core tube which extends through the machine and having upstream of the extrusion orifice at least one intermediate die or point, the intermediate die or dies being so positioned with respect to the inner and outer dies and, when appropriate, to one another that the extruded layers of the covering materials are caused to come into complete and intimate interfacial contact upstream of the extrusion orifice, sealing means at the rear end of the core tube which permits passage of the core therethrough, a treatment chamber which is hermetically sealed to the outlet end of the extrusion machine and through which the covered core emerging from the extrusion orifice is adapted to pass, means for introducing a fluid medium under super-atmospheric pressure into the treatment chamber, and means for injecting a fluid under pressure into the interior of the core tube.

Preferably the apparatus also includes a differential pressure control device associated with the treatment chamber and with the core tube, whereby the injection of fluid under pressure into the core tube can be automatically controlled to maintain the pressure difference across the extruded composite covering at the extrusion orifice at the desired value.

The pressure difference maintained across the covering at the extrusion orifice will depend to some extent on the material of the covering and on its radial thickness. For example, where the covering material is polyethylene the pressure difference preferably lies within the approximate range 0.3 to 1.0 atmospheres but with other materials or in other circumstances it could be as high as 3 atmospheres or as low as 0.001 atmosphere.

Preferably also the apparatus includes a vacuum pump connected to the core tube and the vacuum pump also be controlled by the differential pressure control device, the arrangement being such that a substantially constant pressure difference can be established and maintained across the extruded composite covering at the extrusion orifice from initial start-up conditions, when the pressure inside the treatment chamber is atmospheric, until normal running conditions are attained.

The invention will now be described in more detail, and by way of example, with reference to the accompanying drawings in which:

FIG. 1 is a general diagrammatic side elevation of apparatus in accordance with the invention for curing an extruded composite covering;

FIG. 2 is a diagrammatic longitudinal cross-section of the head of a cross head extruder forming part of the apparatus;

FIG. 3 is a diagrammatic representation of one form of differential pressure control system for use in the apparatus of the present invention.

Figure 4:
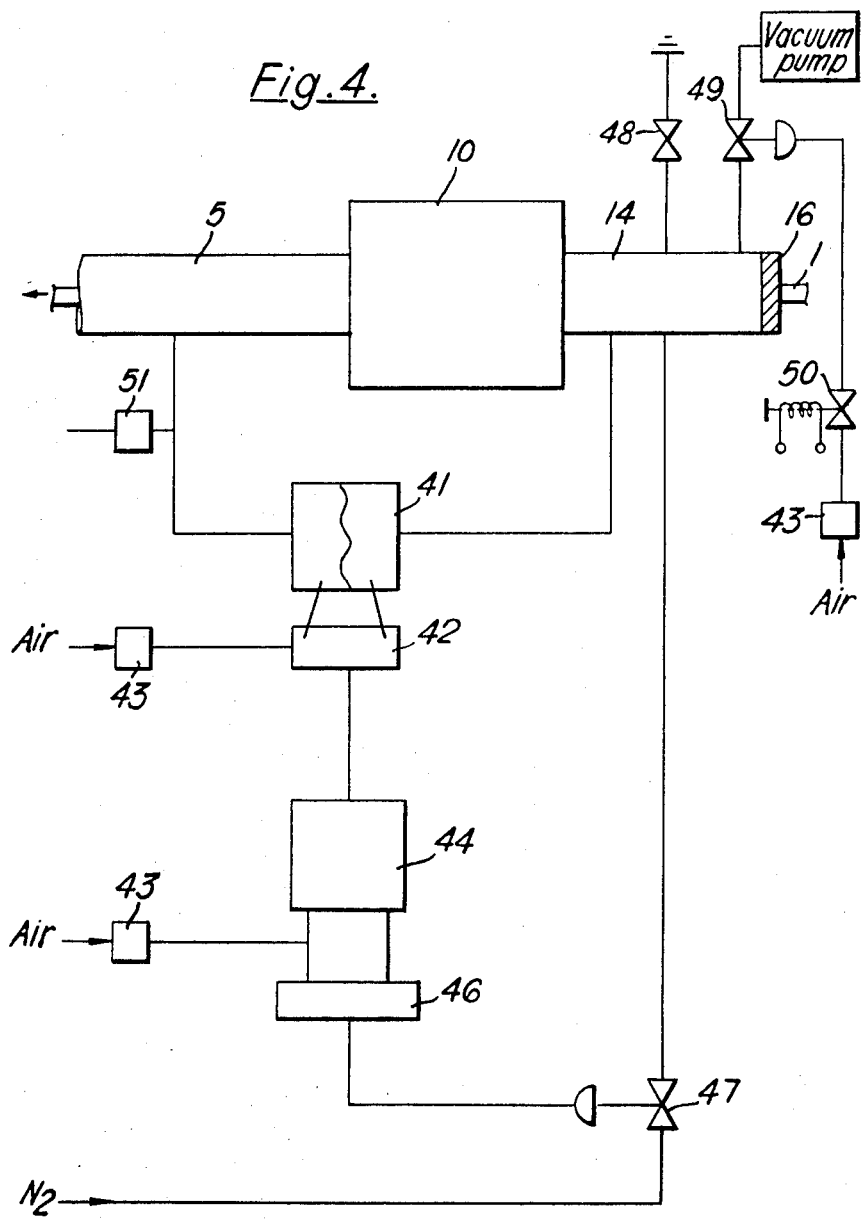
FIG. 4 is a diagrammatic representation of an alternative form of differential pressure control system.

As will be seen on referring to FIG. 1 a bare solid aluminium conductor 1 of substantially sector-shaped cross-section, to which is to be applied an extruded composite covering comprising an inner layer of semi-conductive polyethylene bonded in complete and intimate interfacial contact to an outer insulating layer of polyethylene, is drawn from a drum 2 by a haul-off unit 3 and is fed into an extrusion machine 4 where the composite covering is applied. On emerging from the head of the extrusion machine 4 the covered conductor 1 passes immediately into an inclined curing chamber filled with steam at superatmospheric pressure and, at its lower end, with cooling water at the same pressure and hermetically sealed to the outlet end of the extrusion machine from where it travels through vessels of cooling fluid (not shown) and is fed on to a take-up drum 7 by a haul-off unit 6.

Referring now to FIG. 2, the cross-head 10 of the extrusion machine 4 has at its outlet end an annular extrusion orifice defined by an outer die 11 an an inner die or point 12 which is secured to the forward end of a core tube 14 extending through the head. Upstream of the extrusion orifice is an intermediate die or point 13. Semi-conductive polyethylene 8 in a plastic state is fed to the annular space between the inner die 12 and intermediate die 13 through a supply passage 15 and polyethylene 9 in a plastic state is fed to the annular space between the intermediate die 13 and the outer die 11 through a supply passage 17. The intermediate die 13 is so positioned with respect to the outer die 11 and inner die 12 that the extruded layers 8 and 9 of the semi-conductive polyethylene and insulating polyethylene come into complete and intimate interfacial contact upstream of the extrusion orifice. At the rear end of the core tube 14 is a seal 16 which effects a fluid-tight seal with the conductor 1 as it passes into the core tube. The curing chamber 5 hermetically sealed to the cross-head 10 is of substantially cylindrical cross-section and has at its outlet end a seal which effects a fluid-tight seal with the composite covered conductor as it emerges from the chamber.

During extrusion on the conductor 1 of the composite covering comprising the semi-conductive polyethylene layer 8 and insulating polyethylene layer 9 and curing of the extruded composite covering in the curing chamber 5, the steam in the curing chamber will be at super-atmospheric pressure, e.g. a pressure within the range 133,500 to 147,500 kgm./sq. m. (190 to 210 p.s.i.g.). Nitrogen under pressure is injected into the core tube 14 and by means of a differential pressure control device associated with the curing chamber 5 and the core tube the pressure difference across the extruded composite covering at the extrusion orifice is maintained substantially constant at a pressure within the approximate range 0.03 to 0.07 atmospheres.

By this method a composite covering comprising an inner semi-conductive cross-linkable polyethylene layer of radial thickness 0.5 mm. (0.02 in.) and an outer insulating cross-linkable polyethylene layer of radial thickness 2.8 mm. (0.10 in.) can be applied to a sector-shaped conductor 1 with a total tolerance of plus or minus 0.05 mm. (0.002 in.).

Two alternative forms of differential pressure control system for maintaining the substantially constant pressure difference across the extruded composite covering as it emerges from the extrusion orifice of the extrusion machine 4 are shown in FIGS. 3 and 4.

In the first differential pressure control system shown in FIG. 3 a differential pressure control device 21 of the twin bellows type (operating in a similar manner to an aneroid barometer) is associated with the curing chamber 5 and with the core tube 14 and has a pointer 22 which indicates on a chart the pressure difference across the extruded composite covering at the extrusion orifice. The shaft 23 of the pointer 22 carries two mercury bulb switches 24 and 25. Switch 24 is adapted to actuate a solenoid valve 26 which controls leakage of nitrogen from the core tube 14 and switch 25 is adapted to actuate a solenoid valve 27 which controls injection of nitrogen under pressure into the interior of the core tube. The switches 24 and 25 are suitably circumferentially spaced on the shaft 23 with respect to a predetermined reading of the pressure difference across the extruded composite covering at the extrusion orifice in such a way that each is closed or opened at an appropriate error in pressure difference across the extruded covering to effect opening or closing of its respective solenoid valve 26 or 27 and to produce the necessary compensating action. Valves 28, 29 and 30 are provided for manual control of injection of nitrogen and valve 31 is provided for manual control of leakage of nitrogen. Valve 32 controls a vacuum pump used during initial start-up of the apparatus.

In operation, if the pointer 22 records a decrease in pressure difference across the extruded composite covering at the extrusion orifice in excess of a predetermined amount the switch 24 will close to open automatically the valve 26 and cause nitrogen to leak from the core tube 14 until the required pressure difference is raised and the switch 24 reopens and thus effects closure of the valve 26. Conversely, if an increase in pressure difference above a predetermined amount is recorded by the pointer 22 switch 25 will close and will cause valve 27 to open automatically to allow nitrogen to be injected into the core tube 14 until the pressure difference decreases to such a value that switch 25 will open and cause valve 27 to close. By manual control of valve 28 the extrusion machine operator can over-ride the automatic control if necessary during rapid changes in steam pressure or level of cooling water in the chamber 5, e.g. during start-up or shut down.

In the system shown in FIG. 4 a differential pressure cell 41 is associated with the curing chamber 5 and core tube 14 and is connected through a mechanical-pneumatic-transducer 42, fed with air through a filter regulator 43, to a receiver/controller 44. The receiver/controller 44 is connected through an auto/manual station 46 to a diaphragm flow valve 47 which controls continuous injection of nitrogen into the core tube 14. Continuous leakage of nitrogen from the core tube 14 is allowed to take place through a valve 48. A diaphragm flow valve 49 controls a vacuum pump used to evacuate the core tube 14 when starting up the apparatus.

In operation, the differential pressure cell 41 transmits through the transducer 42 a pneumatic signal, proportional to the pressure difference across the extruded composite covering at the extrusion orifice, to the receiver/controller 44 which generates a pneumatic power signal for controlling the diaphragm flow valve 47. This signal is proportional to the error between the measured pressure difference across the extruded composite covering and a level of pressure difference pre-set in the receiver/controller 44. In accordance with the signal received the diaphragm flow valve 47 will automatically either open or close to increase or decrease the flow of nitrogen into the core tube 14. The diaphragm flow valve 49 associated with the vacuum pump may also be automatically controlled by a solenoid valve 50 adapted to be actuated by a pressure switch 51 connected to the chamber 5, which will actuate the valve to close the diaphragm flow valve when the pressure in the chamber rises above atmospheric pressure.

The automatic/manual station 46 provides for manual control of the flow valve 47 if desired.

Where fluid in the core tube is permitted to leak continuously from the core tube and is continuously injected into the core tube under the automatic control of a differential pressure control device, continuous leakage of the fluid may take place through a valve connected to the core tube and/or, by suitable adjustment of the seal at the upstream end of the core tube, it may be permitted to take place through the seal. In the latter case the leaking fluid serves to reduce the friction between the travelling core and the seal.

Sealing means suitable for sealing the rear end of the core tube apparatus in accordance with the invention forms the subject of co-pending application No. 96,539, filed Dec. 9, 1970, which is owned by the assignee of this application.

What I claim as my invention is:

1. In the manufacture of an extruded covering on a continuously advancing core by means of an extrusion machine having a core tube extending through the machine, an inner die or point mounted on the front end of the core tube and an outer die at the outlet end of the machine which defines with the inner die or point an annular extrusion orifice having an internal diameter substantially greater than the external diameter of the extruded covering and by a float-down process in which the core is drawn through the core tube of the extrusion machine, a continuous covering is applied to the core at the extrusion orifice and a pressure difference is maintained across the extruded covering at the extrusion orifice sufficient to cause the extruded covering to collapse firmly onto the core as it emerges from the extrusion machine but insufficient to force the extruded covering back along the core tube, the radial thickness of the extruded covering being controlled by varying the speed at which the core is drawn through the extrusion machine, the improvement comprising:

(A) extruding by the extrusion machine at least two peripherally continuous layers of different covering materials and feeding the layers simultaneously towards the outlet end of the extrusion machine;

(B) causing the extruded layers to come into complete and intimate interfacial contact upstream of the outlet end of the extrusion machine to form a continuous composite covering;

(C) continuously treating the composite covering so formed with a fluid medium at superatmospheric pressure by passing the covered core through a chamber hermetically sealed to the outlet end of the extrusion machine and containing the fluid medium at super-atmospheric pressure;

(D) injecting fluid under pressure into the interior of the core tube; and (E) maintaining the fluid in the core tube at a pressure which is less than that of the fluid medium by an amount such that the said pressure difference across the extruded composite covering at the extrusion orifice is maintained.

2. A method as claimed in claim 1, wherein the treatment of the composite covering is a curing process.

3. A method as claimed in claim 1, wherein the treatment of the composite covering is a cooling process.

4. A method as claimed in claim 1, wherein the fluid injected under pressure into the interior of the core tube is automatically maintained at a pressure which is less than that of the fluid medium by a substantially constant predetermined amount by means of a differential pressure control device associated with the treatment chamber and with the core tube which automatically controls the injection of fluid into the core tube.

5. A method as claimed in claim 4, wherein the differential pressure control device also automatically controls leakage of fluid from the core tube.

6. A method as claimed in claim 4, wherein fluid is permitted to leak continuously from the core tube and is continuously injected into the core tube under the automatic control of the differential pressure control device.

7. A method as claimed in claim 4, wherein at initial start-up of the process with the pressure inside the treatment chamber substantially that of atmospheric pressure, the core tube is evacuated until the pressure difference across the extruded composite covering at the extrusion orifice is at a predetermined value, and the fluid treatment medium and the core tube fluid, respectively, are injected into the treatment chamber and core tube whilst a substantially constant pressure difference is maintained across the extruded composite covering at the extrusion orifice by means of the differential pressure control device.

8. A method as claimed in claim 4, wherein the fluid injected into the core tube is an inert gas.

9. In the manufacture of an extruded covering on a continuously advancing core by means of an extrusion machine having a core tube extending through the machine, an inner die or point mounted on the front end of the core tube and an outer die at the outlet end of the machine which defines with the inner die or point an annular extrusion orifice having an internal diameter substantially greater than the external diameter of the extruded covering and by a float-down process in which the core is drawn through the core tube of the extrusion machine, a continuous covering is applied to the core at the extrusion orifice and a pressure difference is maintained across the extruded covering at the extrusion orifice sufficient to cause the extruded covering to collapse firmly onto the core as it emerges from the extrusion machine but insufficient to force the extruded covering back along the core tube, the radial thickness of the extruded covering being controlled by varying the speed at which the core is drawn through the extrusion machine, the improvement comprising:

(A) extruding by the extrusion machine a peripherally continuous layer of insulating material sandwiched between inner and outer peripherally continuous layers of semi-conductive material and feeding all of said layers simultaneously towards the outlet end of the extrusion machine;

(B) causing the three extruded layers to come into complete and intimate interfacial contact upstream of the outlet end of the extrusion machine to form a continuous composite covering;

(C) continuous treating the composite covering so formed with a fluid medium at superatmospheric pressure;

(D) injecting fluid under pressure into the interior of the core tube; and (E) maintaining the fluid in the core tube at a pressure which is less than that of the fluid medium by an amount such that the said pressure difference across the extruded composite covering at the extrusion orifice is maintained.

10. A method as claimed in claim 9, wherein the inner and outer layers are of different semi-conductive materials, the semi-conductive material of the outer layer being of such a composition that the bond with the underlying layer of insulating material is weaker than that between the inner layer of semi-conductive material and the overlying layer of insulating material.

References Cited
UNITED STATES PATENTS

| | | | |
|---|---|---|---|
| 3,446,883 | 5/1969 | Garner | 264—174 |
| 3,538,207 | 11/1970 | Toole | 264—174 X |
| 3,404,432 | 10/1968 | White et al. | 264—174 X |
| 2,384,224 | 9/1945 | Williams | 264—174 |

ROBERT F. WHITE, Primary Examiner

J. H. SILBAUGH, Assistant Examiner

U.S. Cl. X.R.

264—85, 89, 90, 174; 425—113, 149